United States Patent
Neier et al.

(10) Patent No.: US 7,172,137 B2
(45) Date of Patent: Feb. 6, 2007

(54) MATERIAL SPREADER AND METHOD FOR USING SAME

(75) Inventors: Benjamin R. Neier, Dodge City, KS (US); Rodney R. Neier, Dodge City, KS (US); Gregory R. Reimer, Dodge City, KS (US); David J. Brouwer, Prinsburg, MN (US); Luke D. Prouty, Montevideo, MN (US); Elizabeth B. Rheingans, Correll, MN (US); Jeff A. Schultz, Montevideo, MN (US); Jason M. Schwiderski, Benson, MN (US); Barbara M. Springman, New London, MN (US); Jeremy J. Waltz, Montevideo, MN (US); David J. Gelhar, DeGraff, MN (US); Kevin R. Wald, Montevideo, MN (US); Todd E. Osman, Montevideo, MN (US); James E. Shafer, Dodge City, KS (US)

(73) Assignee: Roto-Mix, LLC, Dodge City, KS (US)

( * ) Notice: Subject to any disclaimer, the term of this patent is extended or adjusted under 35 U.S.C. 154(b) by 599 days.

(21) Appl. No.: 10/673,625

(22) Filed: Sep. 29, 2003

(65) Prior Publication Data

US 2005/0067515 A1    Mar. 31, 2005

(51) Int. Cl.
   *A01C 17/00*   (2006.01)
(52) U.S. Cl. .......................... 239/1; 239/661; 239/667; 239/669; 239/671; 239/672; 239/679; 239/682
(58) Field of Classification Search ................ 239/661, 239/664, 667, 669, 672, 673, 679, 681, 682, 239/671, 1
   See application file for complete search history.

(56) References Cited

U.S. PATENT DOCUMENTS

| | | | | |
|---|---|---|---|---|
| 1,011,624 | A | * | 12/1911 | Johnson et al. .............. 239/667 |
| 1,025,403 | A | * | 5/1912 | Johnson et al. .............. 239/667 |
| 2,676,002 | A | * | 4/1954 | Wolfe .......................... 239/664 |
| 3,333,574 | A | | 8/1967 | Harris |
| 3,754,528 | A | | 8/1973 | Downing |
| 4,593,555 | A | | 6/1986 | Krutz et al. |
| 4,732,330 | A | * | 3/1988 | Groeneveld et al. ........ 239/672 |
| 5,170,948 | A | * | 12/1992 | Glick et al. ................. 239/681 |
| 5,469,797 | A | | 11/1995 | Hearne, Jr. |
| 5,501,404 | A | * | 3/1996 | Meyer et al. ................ 239/679 |
| 6,143,183 | A | | 11/2000 | Wardwell et al. |

* cited by examiner

*Primary Examiner*—Steven J. Ganey
(74) *Attorney, Agent, or Firm*—McKee, Voorhees & Sease, P.L.C.

(57) ABSTRACT

A material spreader includes a belt/chain assembly. The belt is mounted within the chamber of the material spreader and the chain remains out of contact with the material during the operation of the device. A sliding barrier is mounted at the rear of the belt, and moves from a forward position adjacent the front of the spreader to a rear position adjacent the rear of the spreader.

13 Claims, 5 Drawing Sheets

MATERIAL SPREADER AND METHOD FOR USING SAME

BACKGROUND OF THE INVENTION

This invention relates to a material spreader and method for using same. It may be used for spreading manure, compost, sludge, paunch or other materials. Conventional material spreaders utilize a series of horizontal bars extending laterally across the floor of the spreader box. These bars move by chains in a rearward direction so as to carry the material rearwardly where it is spread by various types of rotating members.

One disadvantage of the present method for conveying the material to the rear of the spreader is that if a chain breaks or is damaged in any way, the entire contents must be removed from the wagon in order to make any repair.

Therefore, a primary object of the present invention is the provision of an improved material spreader and method for using same.

A further object of the present invention is the provision of an improved material spreader which utilizes a belt that spans the width of the material spreader box.

A further object of the present invention is the provision of a material spreader and method for using same which maintains a chain drive for moving a belt, wherein the chain drive is never exposed to the material carried by the belt.

A further object of the present invention is the provision of an improved material spreader and method for using same which utilizes a sliding barrier at the rear of the belt for moving the material in a rearward direction for discharge from the material spreader.

A further object of the present invention is the provision of a material spreader and method for using same which is economical to manufacture, durable in use, and efficient in operation.

BRIEF SUMMARY OF THE INVENTION

The foregoing objects may be achieved by a material spreader comprising a material spreader box having a bottom wall, opposite sidewalls, a front wall, and a rear wall forming a material storage chamber for storing a quantity of material. The bottom wall includes opposite side edges from which the opposite sidewalls extend upwardly. The bottom wall also includes a front end from which the front wall extends upwardly. A discharge opening is adjacent the rear end of the bottom wall. A conveyor belt is superimposed over the bottom wall and is positioned for supporting a quantity of material contained within the material storage chamber. The conveyor belt has a width that causes the conveyor belt to substantially completely cover the width of the bottom wall. A drive mechanism is connected to the conveyor belt for moving the conveyor belt relative to the bottom wall in a rearward direction toward the rear wall of the material spreader box whereby the conveyor belt will carry the quantity of material within the material storage chamber in a rearward direction and will discharge the material through the discharge opening at the rear end of the bottom wall. A beater assembly is mounted to the rear of the box for engaging and spreading the material exiting from the discharge opening.

According to another feature of the invention the drive mechanism comprises a chain and sprocket assembly connected to the conveyor belt.

According to another feature of the invention the chain and sprocket assembly is located outside the material storage chamber and is free from contact with the quantity of material stored within the material storage chamber.

According to another feature of the present invention the beater assembly comprises a plurality of beater bars mounted to the material spreader box for rotation about a plurality of upstanding axes.

According to another feature of the present invention the beater bars rotate about a plurality of horizontal axes.

According to another feature of the present invention a first roller and a second roller are spaced apart from one another and are mounted for rotation about first and second roller axes respectively. The conveyor belt is trained around at least one of the first and second rollers.

According to another feature of the present invention the chain and sprocket assembly comprises a sprocket on at least one of the first and second rollers and a chain engaging the sprocket for causing rotation of one of the first and second rollers.

The method of the present invention involves mounting a conveyor belt within the material chamber in close covering relation over the bottom wall and substantially covering the width of the bottom wall. A quantity of material is inserted within the material chamber so that the quantity of material rests upon the conveyor belt. The conveyor belt is moved towards the discharge opening in the rear wall whereby the quantity of material will be moved toward and discharged from the material chamber through the discharge opening. The material being discharged from the discharge opening is engaged and spread with rotating beater bars mounted to the rear of the rear wall of the material spreader box.

DETAILED DESCRIPTION OF THE PREFERRED EMBODIMENT

Figure 2:
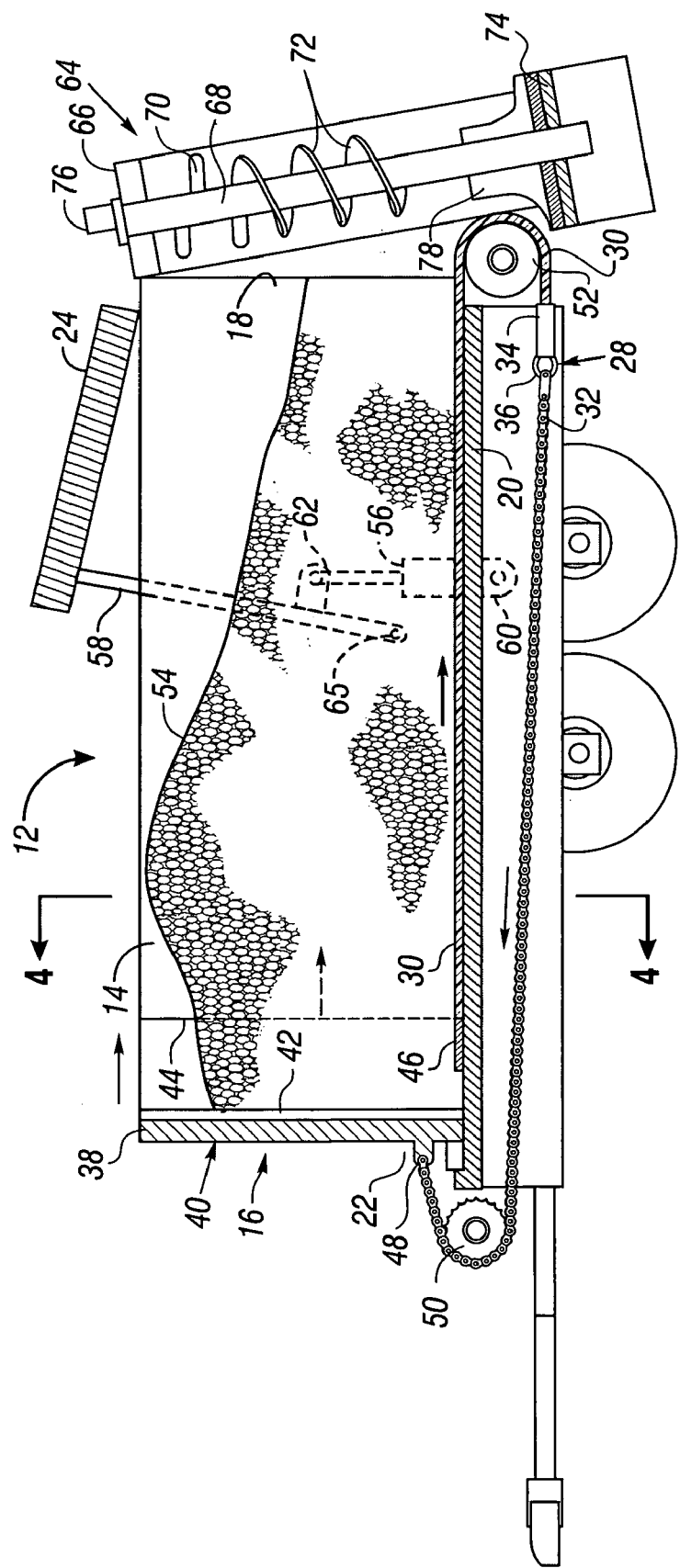
FIG. 2 is a longitudinal sectional view of the material spreader shown in FIG. 1.

Referring to the drawings, the numeral 10 generally designates a material spreader made according to the present invention. Material spreader 10 includes a spreader box 12 comprising opposite sidewalls 14, an open front 16, and an open rear end 18 (FIG. 2). Bottom wall 20 provides a floor for the spreader box 12.

Figure 1:
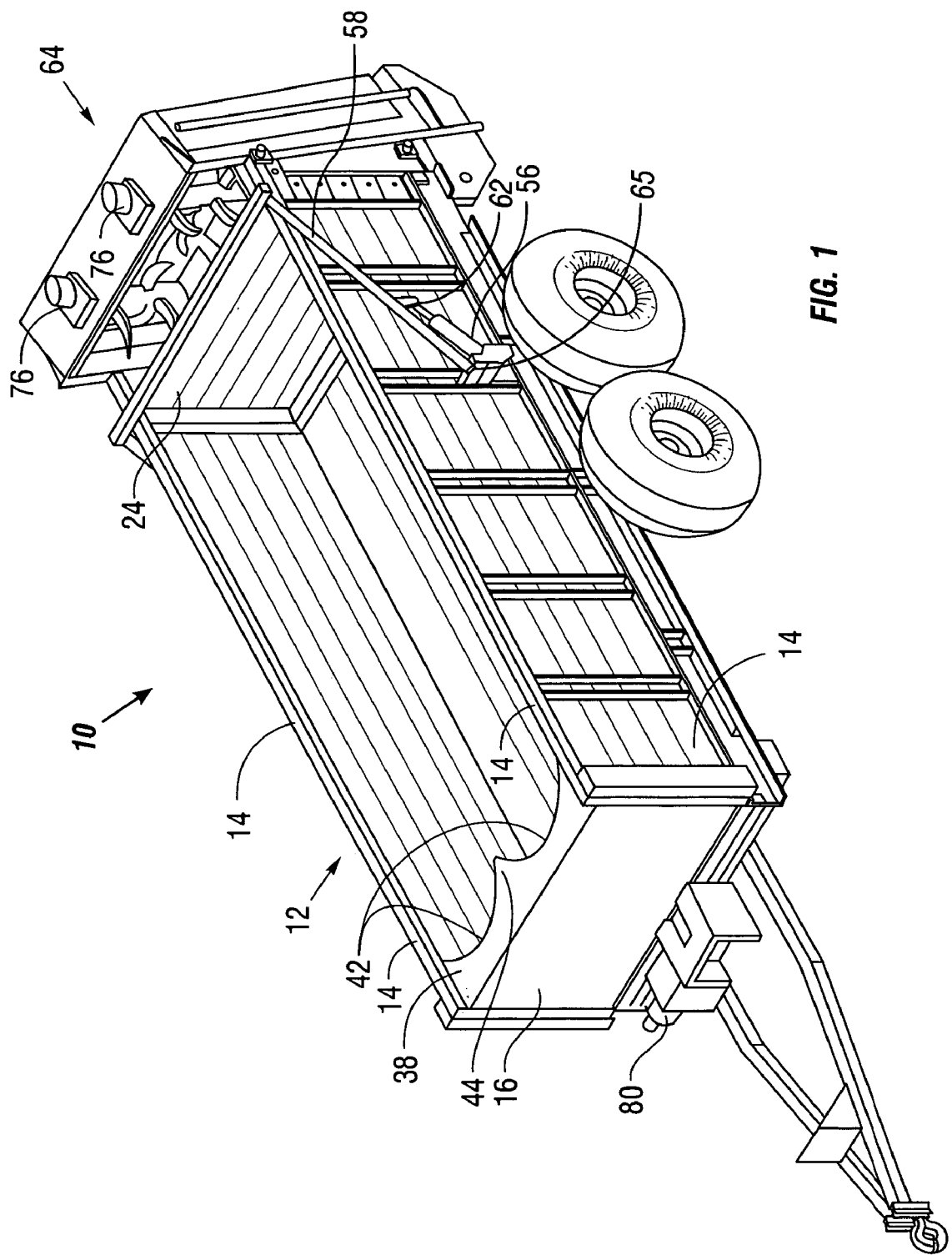
FIG. 1 is a perspective view of the material spreader of the present invention.

A moveable gate 24 is mounted over the open rear end 18 and is capable of vertical pivoting movement from the position shown in FIG. 1 to the position shown in FIG. 2. A belt/chain assembly 28 comprises a belt 30 and a chain 32. Belt 30 is connected to the chain at its forward end by means of a connecting bar 34. Connecting bar 34 includes a chain loop 36 which receives one end of the chain 32. The rear end of the chain 32 is connected to a sliding barrier 38 having a flat rear face 40 and having a double concave front face 42 with a ridge 44 there between. The double concave front face 42 of the sliding barrier 38 includes a belt connection 46 which is connected to the rear end of the belt 30. A chain connector 48 extends from the rear face 40 of the sliding barrier 38 and is connected to the rear end of the chain 32.

Chain 32 is trained around a chain drive sprocket 50 at the front of the material spreader 10. Sprocket 50 is mounted for rotation about a horizontal axis. A belt roller 52 is mounted at the rear of the material spreader 10 and is adapted for rotation about a horizontal axis parallel to the horizontal axis of sprocket 50. The belt/chain assembly is trained around sprocket 50 and roller 52, with the chain being engaged with the sprocket 50 and with the belt 30 being trained around the roller 52. A material load 54 is deposited within the spreader box 12.

A pair of gate lifting cylinders 56 are attached at their lower ends to the spreader box 12 at 60 and are attached at their upper end to an upper connection 62 on arms 58. Each arm 58 is pivoted at its lower end about axis 65 and is rigidly connected at its upper end to gate 24. Extension of this cylinder 56 causes the gate 24 to be lifted upwardly, thereby exposing the open rear end 18 which comprises a discharge end for discharging the material 54 within the spreader box 12.

Figure 5:
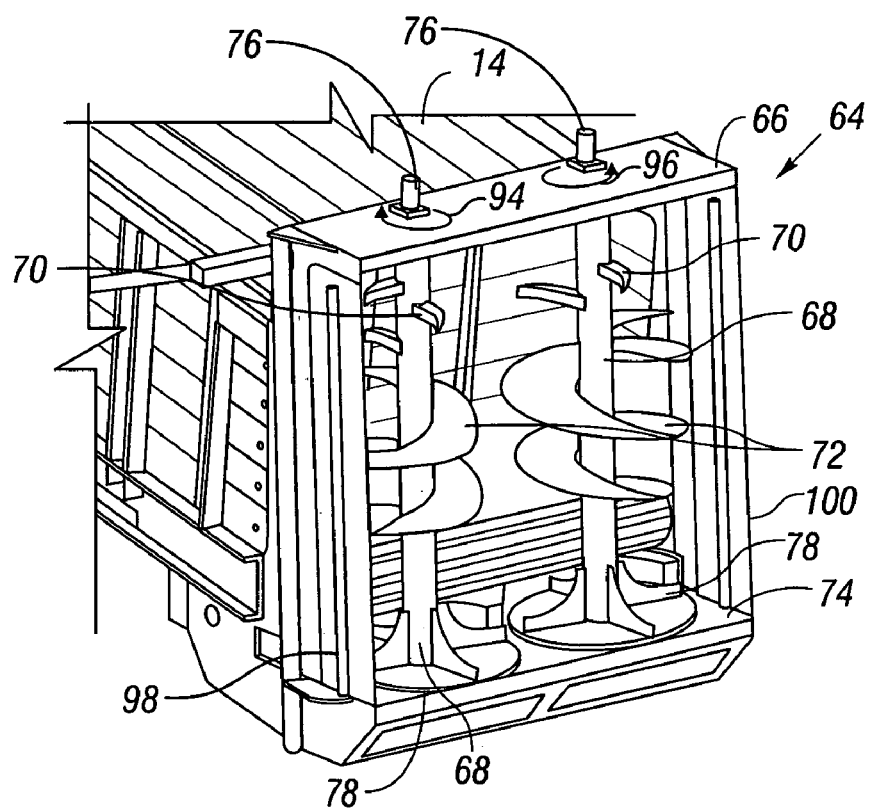
FIG. 5 is a perspective view of the vertically oriented beater bar assembly.

Mounted rearwardly of the gate 24 is a beater assembly 64 which includes a frame 66 and two or more rotatable shafts 68 on which are mounted beater bars 70 and flighting 72. Adjacent the bottom of each shaft 68 is a rotatable bottom plate 74. Each shaft 68 is attached to, and driven by, a hydraulic motor 76, and each bottom plate 74 includes a plurality of spreader flanges 78. The hydraulic motors 76 rotate the shafts 68, and cause the flightings 72, the beater bars 70, and the spreader flange 78 to rotate and to engage the material exiting from the discharge opening 18. The material as a result of this rotation is spread rearwardly from the material spreader. Motor 76 drives the left shaft 68 (as viewed in FIG. 5) in a clockwise direction as indicated by arrow 94. The other motor 76 drives the right shaft 68 in a counterclockwise direction as indicated by arrow 96. Assembly 64 also includes opposite lateral wings 98, 100 (FIG. 5) which are pivotally mounted so as to adjust the spread pattern of material 54 exiting from assembly 64.

Figure 3:
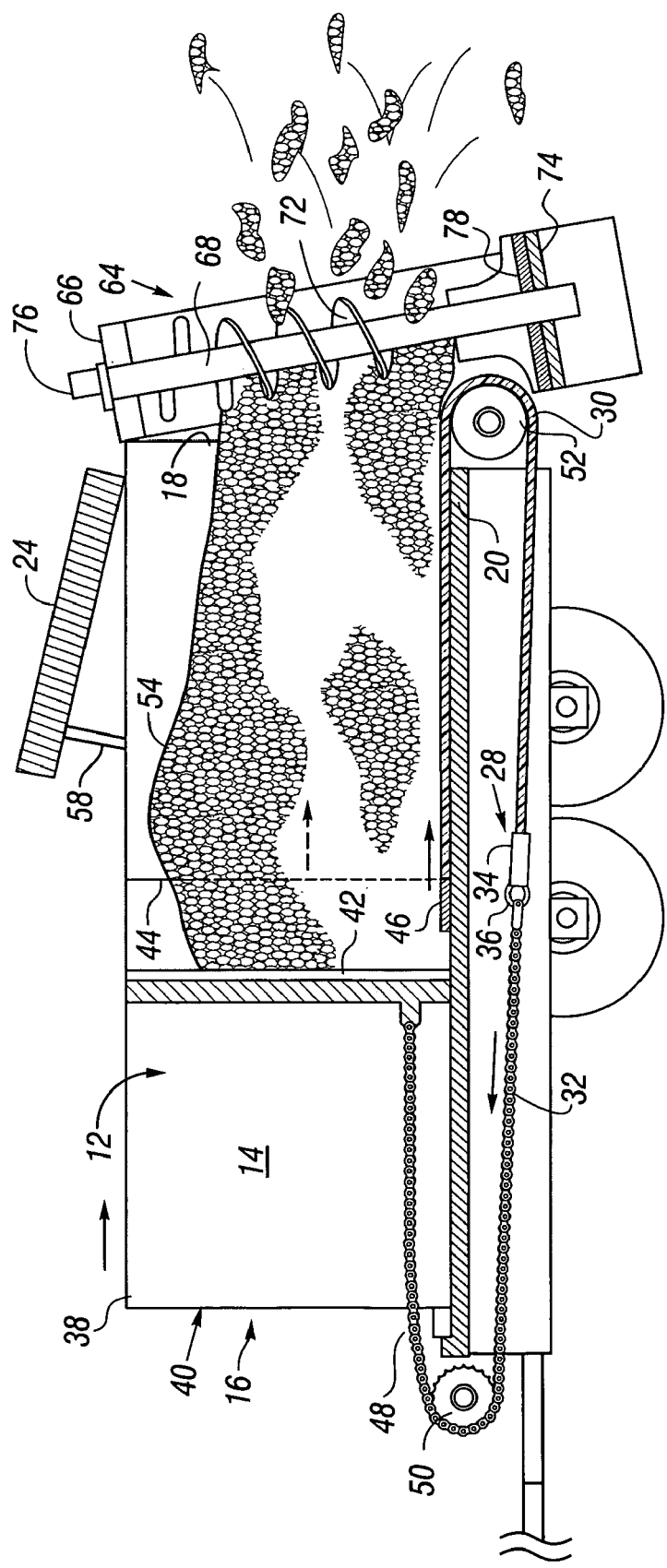
FIG. 3 is a longitudinal sectional view similar to FIG. 2, but showing the belt moved in a rearward direction from the position shown in FIG. 2.

A hydraulic motor 80 is mounted adjacent the front of the spreader box 12 and drives the chain/sprocket assembly 28 by rotating the sprocket 50. The result of this driving action is that the belt 30 and the sliding barrier 38 are moved rearwardly from their initial position shown in FIG. 2 toward the intermediary position shown in FIG. 3. Ultimately the barrier 38 moves completely to the rear of the spreader box 12, thereby discharging all of the material within the spreader box 12. The belt 30 and the chain assembly 28 can then be retracted to their position in FIG. 2 at the end of the cycle. The belt 30 covers the complete bottom wall 20 to the rear of barrier 38. That is, belt 30 spans the width of bottom wall 20, and also spans the length of wall 20 rearward of barrier 38. The edges of belt 30 fit within grooves 82. Thus the belt 30 underlies and supports the material 54 and carries it toward the open rear end 18 of box 12. Prior designs must either push or drag the material 54. Using belt 30 reduces the amount of power required to move the material 54.

During this motion it should be noted that the chain 32 never encounters the material within the material spreader. Only the belt encounters the material. Thus if repairs are necessary to the chain, it is not necessary to remove the material from the spreader box 12.

Figure 4:
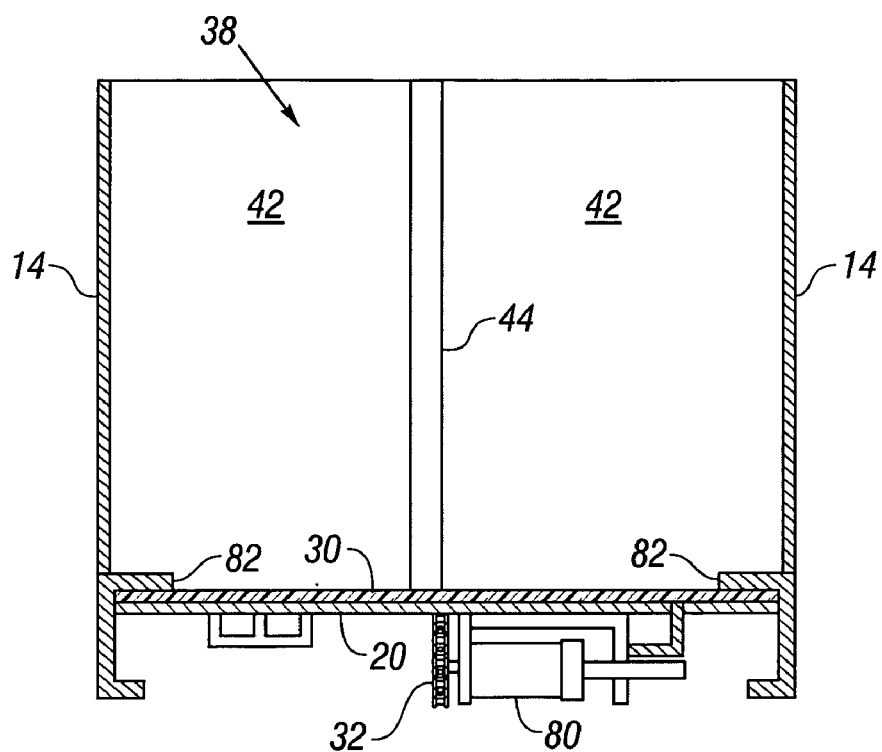
FIG. 4 is a sectional view taken along line 4—4 of FIG. 2.

Furthermore, the belt 30 has its lateral edges guided in slots 82 (FIG. 4). This ensures that all of the material is removed during the movement of the belt 30 and the sliding barrier 38 to their rearward position.

Figure 6:
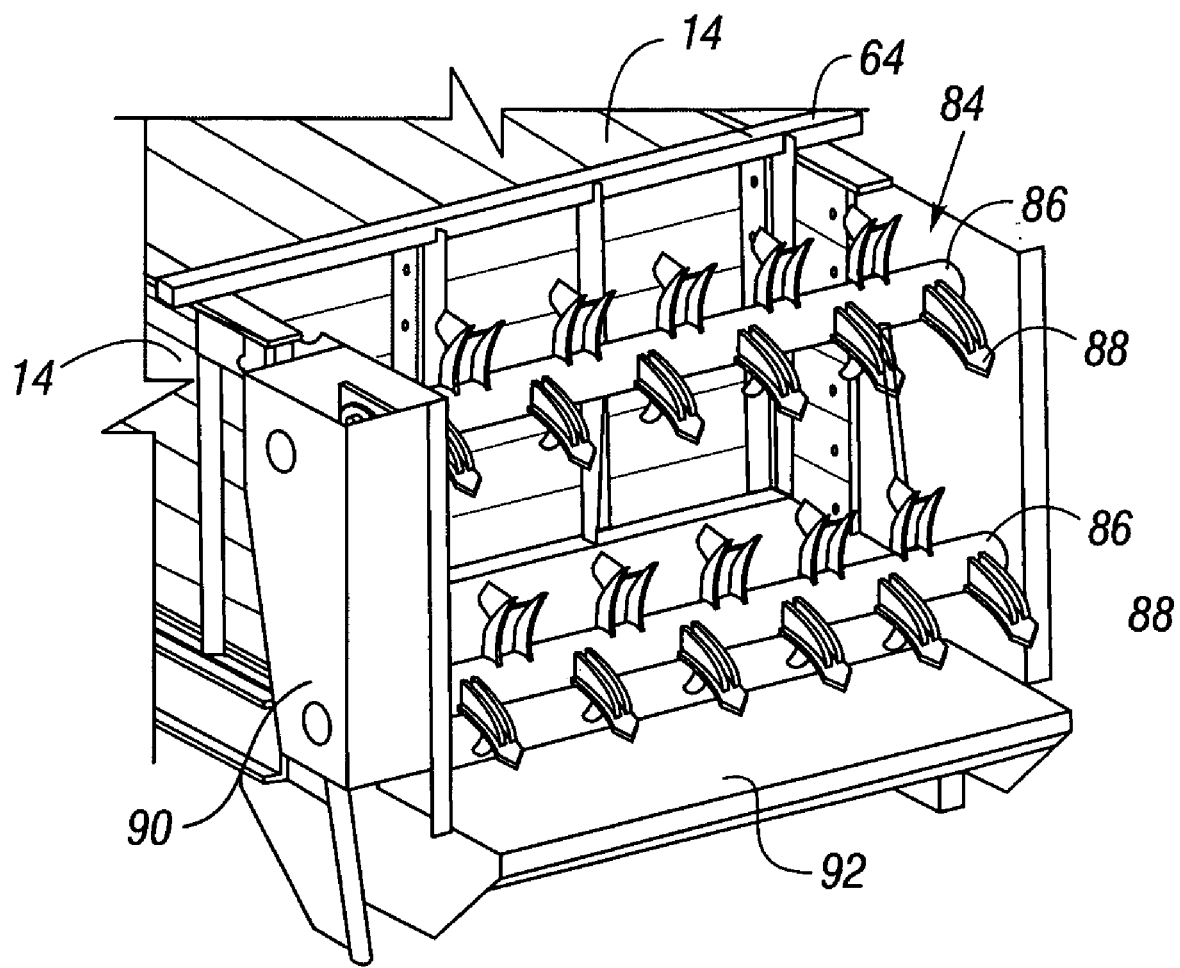
FIG. 6 is a pictorial view of an alternative form of beater bar assembly utilizing horizontally rotatable beater bars.

Referring to FIG. 6, a modified form of beater assembly is designated by the numeral 84. This beater assembly includes a plurality of horizontal shafts 86 which include beater bars 88 mounted thereon. A drive box 90 is driven by a hydraulic motor (not shown) to rotate the horizontal shafts 86. A platform 92 is positioned below the horizontal shafts 86 for causing the material to be distributed rearwardly after being encountered by the rotating beater bars 88 on the shafts 86.

Also, other types of spreader attachments can be used in addition to the vertical and horizontal beaters. For example a side discharge expeller spreader attachment may be used without detracting from the invention.

Furthermore a cable and drum can replace the chain and sprocket assembly to accomplish the same result. A continuous belt may also be used.

While the drawings show a trailer mounted unit, the unit may also be truck mounted. The rate of discharge can be controlled by varying the hydraulic flow to motor 80.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A material spreader for spreading a quantity of material comprising:
    a material spreader box having a bottom wall and opposite side walls forming a storage chamber for storing the quantity of material;
    the bottom wall having a front end, rear end, and opposite side edges from which the opposite side walls extend upwardly;
    a discharge opening in the material spreader box adjacent the rear end of the bottom wall;
    a conveyor belt superimposed over the bottom wall and positioned for supporting the quantity of material contained within the storage chamber, the conveyor belt having a width and that causes the conveyor belt to substantially completely cover the width of the bottom wall;
    a barrier connected to the conveyor belt;
    drive mechanism connected to the conveyor belt for moving the conveyor belt and the barrier relative to the bottom wall in a rearward direction toward the rear end of the bottom wall, whereby the conveyor belt and the barrier will together carry the quantity of material within the storage chamber in a rearward direction and will discharge the material through the discharge opening at the rear end of the bottom wall;
    a beater assembly mounted to the rear of the box for engaging and spreading the material exiting from the discharge opening of the rear wall.

2. The material spreader according to claim 1 wherein the drive mechanism comprises a chain and sprocket assembly connected to the conveyor belt.

3. The material spreader according to claim 2 wherein the chain and sprocket assembly is located outside the storage chamber and is free from contact with the quantity of material stored within the storage chamber.

4. The material spreader according to claim 2 wherein the chain and sprocket assembly comprises a sprocket and a roller spaced apart from one another and mounted for rotation about first and second axes.

5. The material spreader according to claim 4 wherein the chain and sprocket assembly comprises a chain engaging the sprocket for causing rotation thereof.

6. The material spreader according to claim 5 wherein the sprocket is located outside the material storage chamber.

7. The material spreader according to claim 1 wherein the beater assembly comprises a plurality of beater bars mounted to the spreader box for rotation about a plurality of upstanding axes.

8. The material spreader according to claim 1 wherein the beater assembly comprises a plurality of beater bars mounted to the spreader box for rotation about a plurality of horizontal axes.

9. A method for spreading a quantity of material comprising:
   taking a spreader box having opposite sidewalls and a rear discharge opening therein, and a bottom wall forming a material chamber;
   mounting a conveyor belt within the material chamber in close covering relation over the bottom wall and substantially covering the width of the bottom wall;
   attaching a barrier to the conveyor belt;
   inserting the quantity of material within the material chamber between the barrier and the conveyor belt so that the quantity of material rests upon the conveyor belt;
   moving the conveyor belt and the barrier toward the discharge opening whereby the quantity of material will be moved toward and discharged from the material chamber through the discharge opening;
   engaging and spreading the material being discharged from the discharge opening.

10. The method of claim 9 wherein the step of moving the conveyor belt comprises using a movable chain and sprocket assembly connected to the conveyor belt and the barrier to move the conveyor belt and the barrier toward the discharge opening.

11. The method of claim 10 and further comprising maintaining the chain and sprocket assembly away from the material on the conveyor belt so that the chain and sprocket assembly does not engage the quantity of material.

12. The method of claim 11 and further comprising using a chain trained around a sprocket mounted for rotation on the spreader box.

13. A method for spreading a quantity of material comprising:
   taking a spreader box having a pair of opposite side walls and a bottom wall forming a material chamber, the bottom wall having front and rear ends, the spreader box having a discharge opening located adjacent the rear end of the bottom wall;
   training a continuous belt/chain assembly around a chain sprocket and a belt roller, the belt/chain assembly comprising a belt located within the material chamber in close covering relation over the bottom wall and substantially covering the width of the bottom wall, a barrier connected to the belt, and an elongated chain connected to the barrier and connected to the belt;
   inserting the quantity of material within the material chamber so that the quantity of material rests upon the conveyor belt;
   moving the conveyor belt and the barrier toward the discharge opening whereby the quantity of material will be moved toward and discharged from the material chamber through the discharge opening;
   engaging and spreading the material being discharged from the discharge opening; and
   maintaining the chain free from contact with the material within the material chamber.

* * * * *